(12) United States Patent
Kammath et al.

(10) Patent No.: US 11,394,783 B2
(45) Date of Patent: Jul. 19, 2022

(54) CONTENT DRIVEN SERVICE DISCOVERY AND AGENT MONITORING CAPABILITIES ON MANAGED ENDPOINTS

(71) Applicant: VMWARE, INC., Palo Alto, CA (US)

(72) Inventors: V Vimal Das Kammath, Bangalore (IN); Zacharia George, Bangalore (IN); Narendra Madanapalli, Bangalore (IN); Rahav Vembuli, Bangalore (IN); Aditya Sushilendra Kolhar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/540,084

(22) Filed: Aug. 14, 2019

(65) Prior Publication Data

US 2020/0329105 A1  Oct. 15, 2020

(30) Foreign Application Priority Data

Apr. 9, 2019 (IN) .............................. 201941014289

(51) Int. Cl.
*H04L 67/125* (2022.01)
*H04L 67/00* (2022.01)
*H04L 67/51* (2022.01)

(52) U.S. Cl.
CPC ............ *H04L 67/125* (2013.01); *H04L 67/16* (2013.01); *H04L 67/34* (2013.01)

(58) Field of Classification Search
CPC ........ H04L 67/125; H04L 67/16; H04L 67/34
See application file for complete search history.

(56) References Cited

U.S. PATENT DOCUMENTS

| | | | |
|---|---|---|---|
| 9,792,144 B2* | 10/2017 | Hassine | G06F 9/45558 |
| 10,558,541 B1* | 2/2020 | Chakkassery Vidyadharan | G06F 11/301 |
| 2008/0189096 A1* | 8/2008 | Apte | G06F 9/454 704/2 |
| 2009/0024994 A1* | 1/2009 | Kannan | G06F 11/3466 718/1 |
| 2014/0040182 A1* | 2/2014 | Gilder | G06Q 40/12 707/602 |
| 2015/0100955 A1* | 4/2015 | Chen | G06F 8/658 717/170 |
| 2015/0154039 A1* | 6/2015 | Zada | G06F 11/3664 718/1 |
| 2015/0278515 A1* | 10/2015 | Foley | G06F 21/552 726/23 |
| 2015/0378763 A1* | 12/2015 | Hassine | G06F 11/3433 718/1 |
| 2016/0147528 A1* | 5/2016 | Siegmund | H04L 65/4084 717/170 |
| 2016/0246586 A1* | 8/2016 | Madanapalli | G06F 9/5027 |
| 2017/0033980 A1* | 2/2017 | Naous | H04L 41/046 |

* cited by examiner

*Primary Examiner* — Sargon N Nano
*Assistant Examiner* — Kidest Mendaye

(57) ABSTRACT

A content driven service discovery and agent monitoring capabilities on Managed Endpoints methodology and system is disclosed. In a computer-implemented method, content information corresponding to an agent of a monitoring system is generated. Content information is pushed to the agent. The content information is used to alter the agent such that an altered agent is generated. The altered agent is generated without requiring a complete update of the agent.

11 Claims, 9 Drawing Sheets

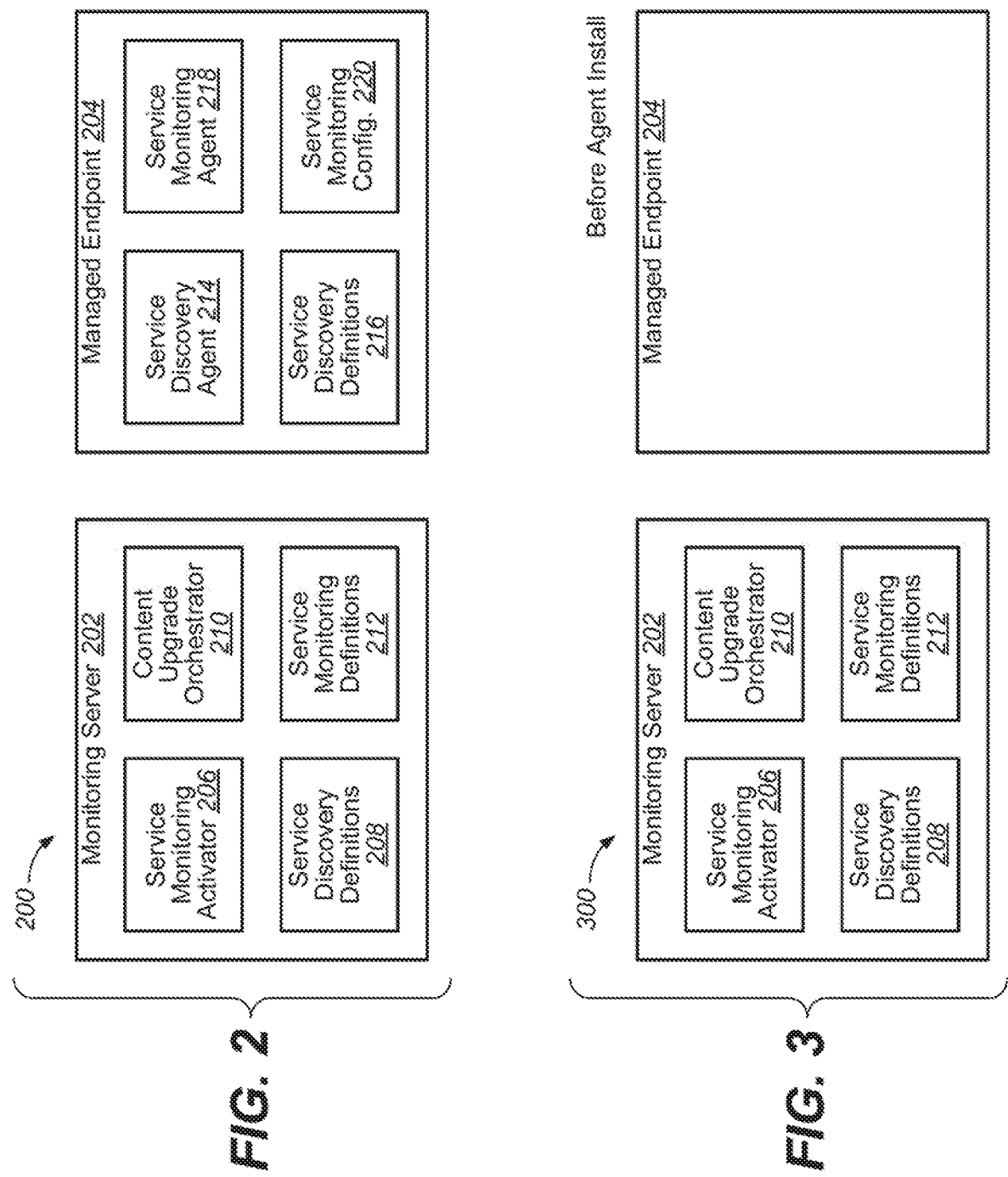

FIG. 6

Manage Agents in Virtual Machines

Manage lifecycle of the agents on the virtual machines here. Also you can discover and manage application services on the virtual machines where agents are installed.

Virtual Machine Filter ⊠ | MANAGE AGENT ∨ | MANAGE SERVICE ∨ | 50 ∨    All Filters ∨  ▽Quick filter (Name)

| ☐ VM Name | Version | vCenter Name | Operating System | Agent status | Last operation status | VM State | Services Discovered |
|---|---|---|---|---|---|---|---|
| ☐ DEMO_MYSQL | 1.1.0.18 | 10.160.145.89 | CentOS 4/5 or later... | ⊘ Agent Running | Content upgrade su... | Powered On | (mysql) |
| ☐ DEMO_FLUENTD | 1.1.0.18 | 10.160.145.89 | CentOS 7 (64-bit) | ⊘ Agent Running | Content upgrade su... | Powered On | None |
| ☐ DEMO_COUCHDB | 1.1.0.18 | 10.160.145.89 | CentOS 7 (64-bit) | ⊘ Agent Running | Content upgrade su... | Powered On | (couchbase) |
| ☑ DEMO_MONGO_PO... | 1.1.0.18 | 10.160.145.89 | CentOS 7 (64-bit) | ⊘ Agent Running | Content upgrade su... | Powered On | (postgresql) (mongodb) |

∨ Datacenter
  Datacenter
  Vimal
∨ HostSystem
  10.126.36.23
  10.126.37.119
  10.160.23.13
∨ vCenter
  10.160.145.89
  Cluster
∨ VM Folder

FIG. 7

MANAGE AGENT ∨ | MANAGE SERVICE ∨ | 50 ∨    All Filters ∨  ▽Quick filter (Name)

[postgresql / mongodb]

| ☐ VM Name | | vCenter Name | Operating System | Agent status | Last operation status | VM State | Services Discovered |
|---|---|---|---|---|---|---|---|
| ☐ DEMO_MYSQL | 1.1.0.18 | 10.160.145.89 | CentOS 4/5 or later... | ⊘ Agent Running | Content upgrade su... | Powered On | (mysql) |
| ☐ DEMO_FLUENTD | 1.1.0.18 | 10.160.145.89 | CentOS 7 (64-bit) | ⊘ Agent Running | Content upgrade su... | Powered On | None |
| ☐ DEMO_COUCHDB | 1.1.0.18 | 10.160.145.89 | CentOS 7 (64-bit) | ⊘ Agent Running | Content upgrade su... | Powered On | (couchbase) |
| ☑ DEMO_MONGO_PO... | 1.1.0.18 | 10.160.145.89 | CentOS 7 (64-bit) | ⊘ Agent Running | Content upgrade su... | Powered On | (postgresql) (mongodb) |

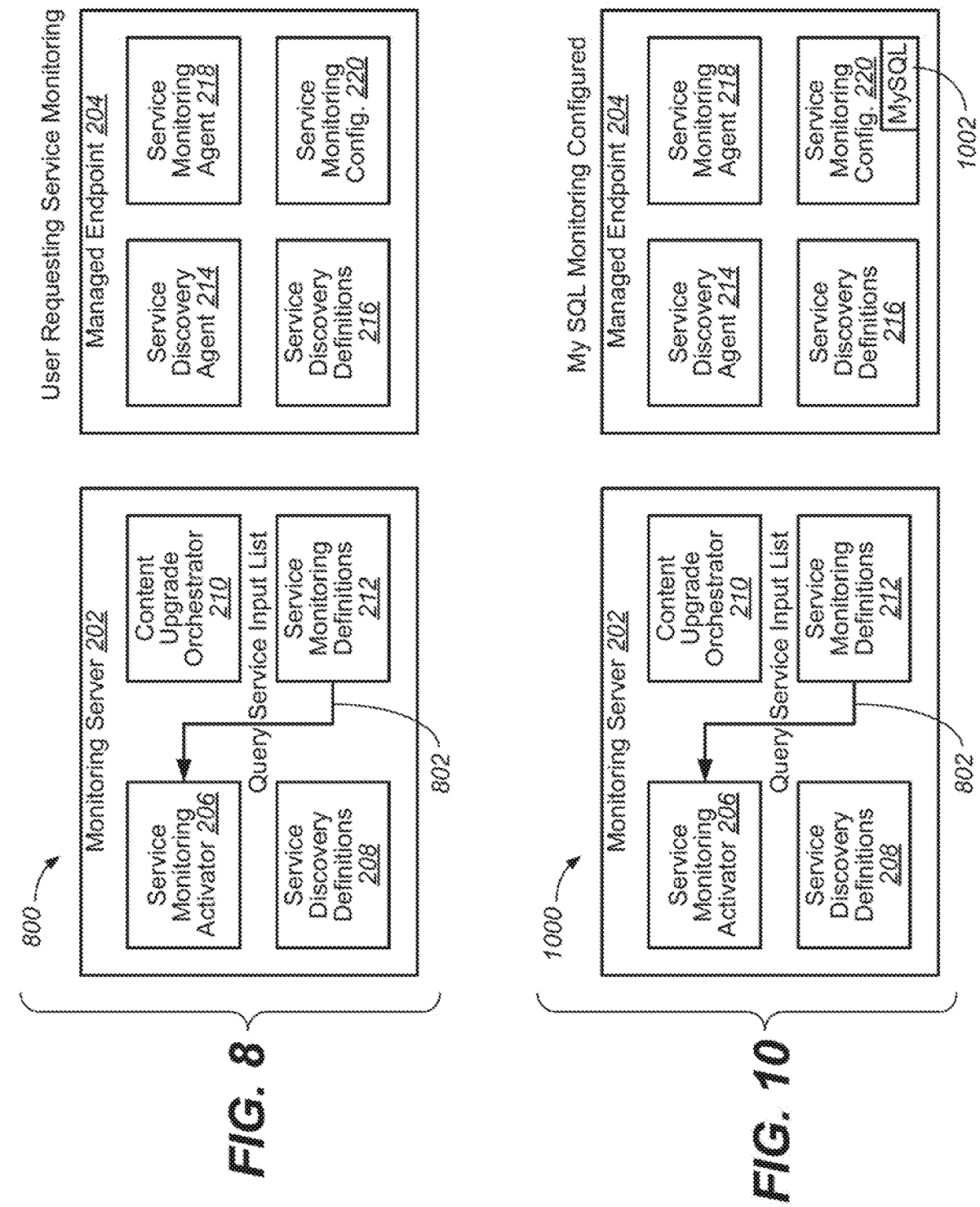

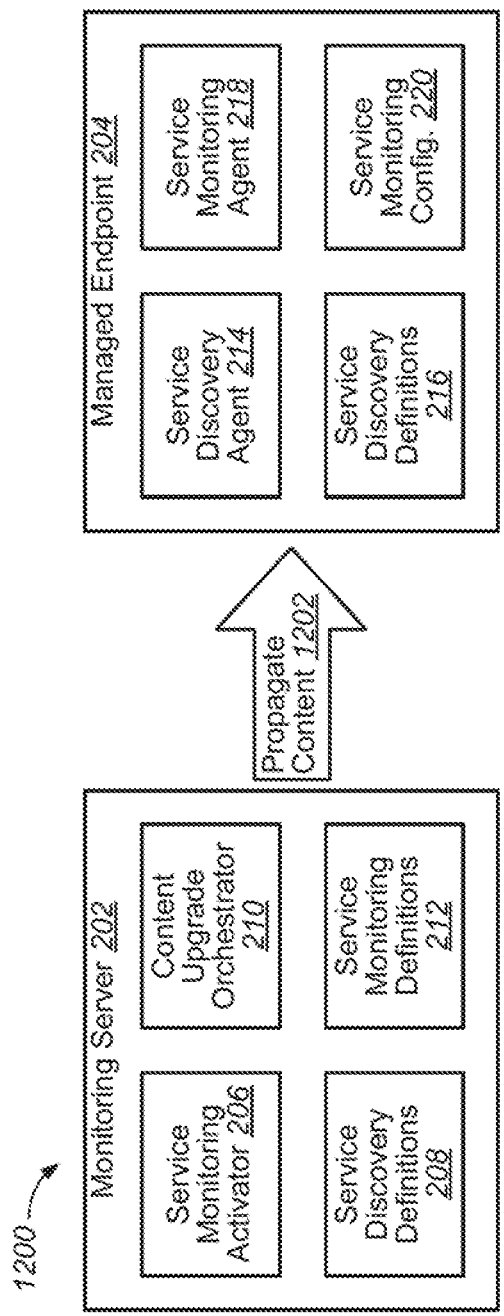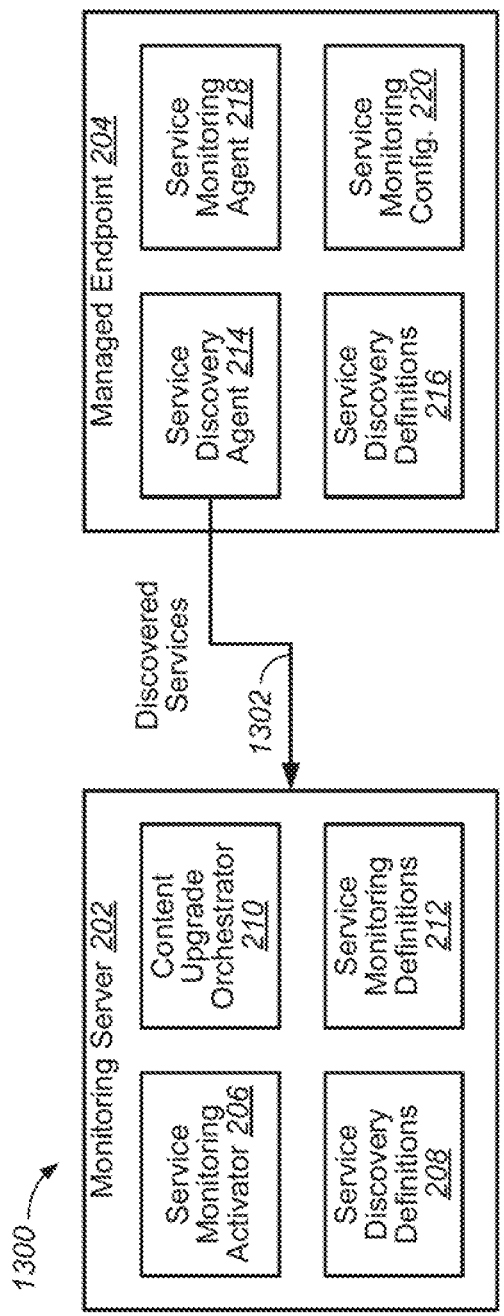
FIG. 12
FIG. 13

CONTENT DRIVEN SERVICE DISCOVERY AND AGENT MONITORING CAPABILITIES ON MANAGED ENDPOINTS

CROSS-REFERENCE TO RELATED APPLICATIONS

This application claims the benefit of and claims priority of co-pending Indian patent application 201941014289, filed on Apr. 9, 2019 entitled "CONTENT DRIVEN SERVICE DISCOVERY AND AGENT MONITORING CAPABILITIES ON MANAGED ENDPOINTS" by Kammath et al., assigned to the assignee of the present application, which is hereby incorporated by reference in its entirety herein.

BACKGROUND ART

In many computing environments, it is necessary to monitor various components, such as, for example, applications and services of the computing environment. Further, it will further be understood, that such monitoring is sometimes accomplished using agents. Such agents are often deployed at various locations, such as, for example, endpoints within the computing environment.

More specifically, in some instances, a Monitoring Server 202 s used in the monitoring of the computer system. The Monitoring Server 202 may provide capabilities to install an agent (or agents) on an endpoint such as, for example, a virtual machine. The agent, operating in conjunction the Monitoring Server 202, then discovers services (and/or applications) running on those endpoints, and the agent then monitors the discovered services. In one such approach, the Monitoring Server 202 does the work of installing one or more agents on the endpoints, and these agents have the capability to discover a certain number of known types of services (and/or applications) and to monitor those services. For purposes of brevity and clarity, throughout the following disclosure, the term "service" or "services" will be used. It should be noted, however, that that following discussion pertains both to services and applications.

Further, in some instances, the agents are able to perform the discovery and monitoring functions upon providing additional information relating to those services such as, for example, a username/password which is specific to that particular service. Often, the process of providing such additional information to an agent (in order for the agent to start monitoring the service) is referred to as "activation" and is accomplished with the assistance of the Monitoring Server 202. Conventionally, such activation requires user input in which the Monitoring Server 202 receives input from the user (e.g., the necessary username/password) which is required to activate monitoring of that service. In such an approach, once such input is received, the Monitoring Server 202 then remotely configures (or reconfigures) the agent at the endpoint to begin the monitoring of the particular service.

As organizations start adopting new products and technologies, new services are developed and implemented. That is, the services used in a computing environment change over time. As a result, there is a need to enhance the capability of the agent to be able to recognize, discover and monitor the new types of services corresponding to the n products and technologies.

As a further drawback to conventional monitoring systems, conventional agents typically have the capability to recognize, discover and monitor only a limited number of services. Hence, as developers add new services to a computing environment, the agent lacks the capability to recognize, discover and monitor the new types of services.

An additional drawback to conventional approaches and monitoring systems, is the related to the complexity involved in deploying and managing the life cycle of the agents. Furthermore, as the monitoring system adds the capability to monitor new applications and services the agents on the endpoint need to be upgraded. Further, such enhancements to a computing environment and/or to the monitoring are done more frequently, for example, in Software as a Service (SAAS) based monitoring systems such as Wavefront™, by VMware, Inc. of Palo Alto, Calif., Pushing such frequent upgrades to every endpoint of a computing environment is an operations nightmare. These above-described drawbacks are even further magnified when there are thousands of endpoints to be monitored.

As yet another disadvantage, in most of the monitoring systems that are in the market today, new features and capabilities are rolled out in new versions of the agent software. This means that a newer version of the agent must be deployed at the endpoints. This conventional approach has several disadvantages. For example, agent installers have large footprint and it costs a lot of network and central processing unit (CPU) resources for distributing the agent installers to many endpoints. As yet another drawback, installing the updated version of the agent (or a software update of the agent) on many endpoints causes a significant spike in the CPU and disk utilization in the overall infrastructure of the computing environment. A further drawback is that many organizations require a complete cycle of security audit and testing before any software is deployed/upgraded on production systems. This requirement further restricts the frequency with which new agent capabilities could be rolled out. Also, a significant further drawback with conventional monitoring systems is that during any upgrade or replacement of a Monitoring Agent 218, any collecting and/or delivering of real time information from the agent is disrupted or entirely halted.

In conventional approaches to discovery and monitoring of services and applications in a computing environment, constant and difficult upgrading of agents is often required. Thus, conventional approaches for application and service discovery and monitoring are not acceptable in complex and frequently revised computing environments.

BRIEF DESCRIPTION OF THE DRAWINGS

The accompanying drawings, which are incorporated in and form a part of this specification illustrate embodiments of the present technology and, together with the description, serve to explain the principles of the present technology.

FIG. 2 is a block diagram of a system including a Monitoring Server and a Managed Endpoint, in accordance with an embodiment of the present invention.

FIG. 3 is a block diagram of a system including a Monitoring Server and a Managed Endpoint before, an Agent install, in accordance with an embodiment of the present invention.

FIG. 6 is a diagram of a graphical user interface for enabling a user to interact with the present content driven service discovery and agent monitoring capabilities on managed endpoints invention, in accordance with an embodiment of the present invention.

FIG. 7 is a diagram of a graphical user interface for enabling a user to interact with the present content driven service discovery and agent monitoring capabilities on managed endpoints invention, in accordance with an embodiment of the present invention.

FIG. 8 is a block diagram of a system including a Monitoring Server and a Managed Endpoint when a user requests service monitoring, in accordance with an embodiment of the present invention.

FIG. 10 is a block diagram of a system including a Monitoring Server and a Managed Endpoint depicting my SQL monitoring configured thereon, in accordance with an embodiment of the present invention.

FIG. 12 is a block diagram of a system including a Monitoring Server and a Managed Endpoint depicting the propagation of content, in accordance with an embodiment of the present invention.

FIG. 13 is a block diagram of a system including a Monitoring Server and a Managed Endpoint depicting the discovery of services, in accordance with an embodiment of the present invention.

Figure 1:
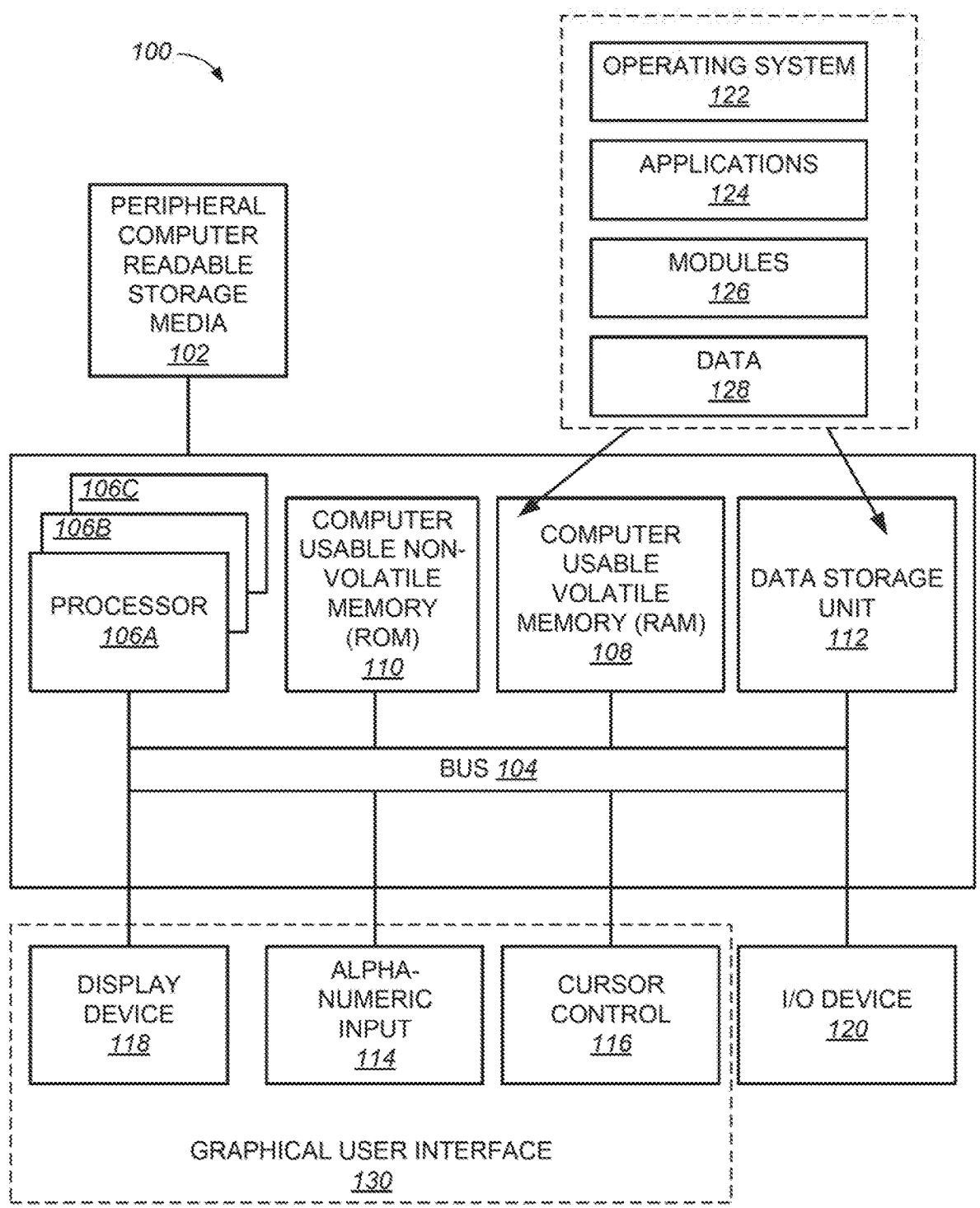
FIG. 1 shows an example computer system upon which embodiments of the present invention can be implemented.

The drawings referred to in this description should not be understood as being drawn to scale except if specifically noted.

DESCRIPTIONS OF EMBODIMENTS

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being, stored, transferred, combined, compared, and otherwise manipulated in an electronic device.

It should be borne in mind, however, that all of these, and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "recognizing", "discovering", "monitoring", "upgrading", "pushing;", "distributing", "re-configuring," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data, represented as physical (electronic and/or magnetic) quantities within the electronic device's registers and memories, into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines programs, objects, components, data structures, etc., that perform particular tasks or implement particular abstract data types. The functionality of the program modules may be combined or distributed as desired in various embodiments.

In the Figures, a single block may be described as performing a function or functions; however, in actual practice the function or functions performed by that block may be performed in a single component or across multiple components and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processions) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor a plurality of microprocessors, one or more microprocessors in conjunction with an SPU core, MPU core, or any other such configuration.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand-alone computer systems, media centers, handheld computer systems, multi-media devices, virtual machines, virtualiztion management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1 system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 1068, and 106C. System 100 also includes a cursor control device 116 coupled with bus 104 for communicating user input information and command selections to processor 106A or processors 106A, 1068, and 106C. In one embodiment, system 100 also includes a display device 118 coupled with bus 104 for displaying information.

Referring still to FIG. 1 display device 8 of FIG. 1 may be a liquid crystal device (LCD), light emitting diode display (LED) device, cathode ray tube (CRT), plasma display device, a touch screen device or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands, in various embodiments, alpha-numeric input device 114, cursor control device 116, and display device 118, or any combination thereof (e.g., user interface selection devices) may collectively operate to provide a graphical user interface (GUI) 130 under the direction of a processor (e.g., processor 106A or processors 106A, 106B, and 106C). GUI 130 allows user to interact with system 100 through graphical representations presented on display device 118 by interacting with alpha-numeric input device 114 and/or cursor control device 118.

System 100 also includes an I/O device 120 for coupling system 100 with external entities. For example, in one embodiment, I/O device 120 is a modem for enabling wired or wireless communications between system 100 and an external network such as but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

First, a brief overview of an embodiment of the present Content Driven Service Discovery And Agent Monitoring Capabilities On Managed Endpoints invention, is provided in the present paragraph. Various embodiments of the present invention provide a method and system for content driven service discovery and agent monitoring capabilities on Managed Endpoints.

The various components of the present embodiments provide a novel approach of separating the knowledge (of discovering and monitoring applications) from an agent. More specifically, various embodiments of the present invention separate the service and/or application specific nuances for discovery and monitoring from the agent software into text-formatted meta-data known as content. In various embodiments of the present invention, additional application and service monitoring skills are delivered to already installed agents on a large number of endpoints such as, for example, virtual machines, by just having the agents download incremental content definitions.

Further, various embodiments of the present invention describe a novel approach for pushing new discovery and monitoring capability to an agent that is already deployed and installed on a live endpoint.

Further, as will be described below, various embodiments of the present invention do not require any software upgrade of the agent at the endpoint to provide the new capabilities to the agent.

In various embodiments of the present invention, as will be described below, the code of a Service Discovery Agent is written to have generalized capabilities to perform individual tasks related to discovery. However, the agent's content defines how to assemble the output, of each of these individual tasks to identify the vendor, version and application signature of a service. Thus, the content defines the knowledge of how an agent can recognize and discover services using the capabilities that it already has.

Similarly n various embodiments of the present invention and as be described below, a Service Monitoring Agent has all of the different capabilities required for monitoring any application, such as the general capability to read data from a uniform resource locator (URL), or connect to a database and extract data from a table. However, in various embodiments of the present invention, as will be described below, the Service Monitoring Agent's content defines the inputs that are required for activating monitoring of a specific service and how these inputs are to be used by that agent.

With reference now to FIG. 2, a block diagram 200 of a system is provided in accordance with an embodiment of the present invention. As shown in FIG. 2, the system includes a Monitoring Server 202 and a Managed Endpoint 204. Still referring generally to various embodiments of the present invention, and still referring to FIG. 2, as will be described below, various embodiments of the present invention consist of two main entities, a Monitoring Server 202 and a Managed Endpoint 204.

As will be described in detail below, in various embodiments of the present invention, the Monitoring Server 202 holds the master copy of the content including, but not limited to, service discovery definitions 208 and the service monitoring definitions 212.

In various embodiments of the present invention, as will be described below, the Monitoring Server 202 has two subcomponents. The first subcomponent is the Service Monitoring Activator 206. The Service Monitoring Activator 206 remotely re-configures the start/stop monitoring service with the inputs provided by the user. In various embodiments, the Service Monitoring Activator 206 uses the "service monitoring definitions 212" to determine how to modify the configuration files of the "Service Monitoring Agent 218" to start or stop monitoring a service.

The second subcomponent of the Monitoring Server 202 is the Content Upgrade Orchestrator 210. In various embodiments of the present invention, as will be described below, the Content Upgrade Orchestrator 210 orchestrates distribution of the content to the end points (e.g., Managed Endpoint 204) that have the Service Monitoring Agents (e.g., Service Monitoring Agent 218) or Service Discovery Agents (e.g., Service Discovery Agent 214) installed thereon.

As will be described in, detail below in various embodiments of the present invention, the Managed Endpoint 204 is comprised of one or more virtual or physical compute resources, on which the agents are installed and managed by the Monitoring Server 202. The agent or agents on the endpoint perform service discovery and service monitoring. As will be described in detail below, in various embodiments of the present invention the Managed Endpoint 204 also includes a Service Discovery Agent 214. The Service Discovery Agent 214 discovers services running on the endpoint based on the information contained in the Service Discovery Definitions 208. The Service Discovery Definitions 208 defines the rules for discovering and identifying specific applications and services by using the capabilities of the Service Discovery Agent 214.

As will be described in detail below, in various embodiments of the present invention, the Managed Endpoint 204 also includes a Service Monitoring Agent 218. The Service Monitoring Agent 218 monitors services, extracts statistics and metrics related to the performance, functionality and the behavior of the services and/or applications that it is monitoring. As will be described in detail below, in various embodiments of the present invention, the Managed Endpoint 204 also includes a Service Monitoring Configuration 220 which defines the list of services that need to be monitored at that endpoint and the details on how that service can be monitored by the Service Monitoring Agent 218.

The below discussion provides a further and detailed description of various embodiments of the present invention.

Importantly, for purposes and brevity and clarity, the following detailed description of the various embodiments of the present invention, will be described using an example in which the monitoring system performing the present Content Driven Service Discovery And Agent Monitoring Capabilities On Managed Endpoints invention, is a VMware provided monitoring product from VMware, Inc. of Palo Alto, Calif. Importantly, although the description and examples herein refer to embodiments of the present invention applied to the above computer system with, for example, its corresponding set of functions, it should be understood that the embodiments of the present invention are well suited to use with various other types of computer systems.

Various embodiments of the present Content Driven Service Discovery And Agent Monitoring Capabilities On Managed Endpoints invention, include separating the knowledge from the function of an agent to achieve a true content driven service discovery and monitoring so that the additional discovery and monitoring capability can be incrementally added by just pushing new knowledge as content to an agent.

With reference now to FIG. 3, a block diagram of a system including a Monitoring Server 202 and a Managed Endpoint 204 before an Agent install is shown, in accordance with an embodiment of the present invention. It will be seen that in the embodiment of FIG. 3, prior to the Agent install, various components are not yet added to Managed Endpoint 204.

With reference now to FIG. 3, a block diagram 300 of a system including a Monitoring Server 202 and a Managed Endpoint 204 before an Agent install is shown, in accordance with an embodiment of the present invention. It will be seen that in the embodiment of FIG. 3, prior to the Agent install, various components are not yet added to Managed Endpoint 204.

Figure 4:
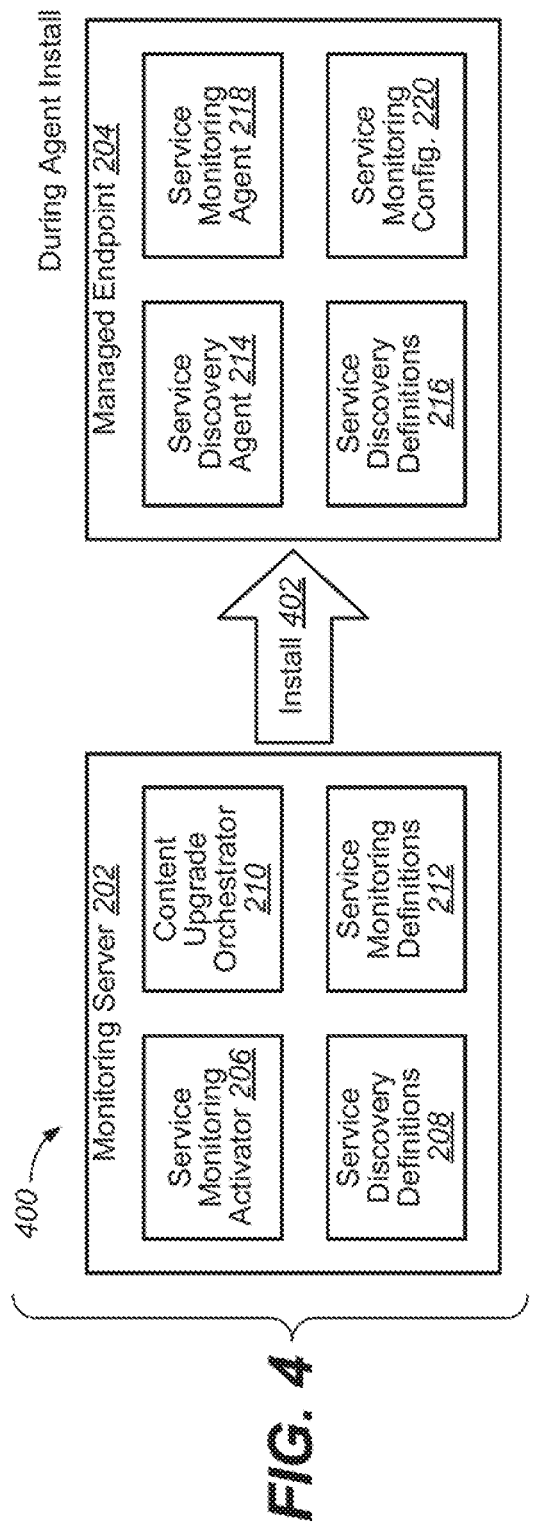
FIG. 4 is a block diagram of a system including a Monitoring Server and a Managed Endpoint during an Agent install, in accordance with an embodiment of the present invention.

With reference ow to FIG. 4, block diagram 400 of a system including a Monitoring Server 202 and a Managed Endpoint 204 during an Agent install is shown, in accordance with an embodiment of the present invention. It will be seen that in the embodiment of FIG. 4, and as depicted by the "Install" arrow 402, in various embodiments of the present invention, Agents are installed on Managed Endpoint 204. More specifically, in embodiments of the present invention a user authorizes the Monitoring Server 202 to install Agents on one (or many) Managed Endpoints 202 as selected, in one embodiment, by the user. In various embodiments of the present invention, a user performs the selection and authorization using, for example, graphical user interface 130 of FIG. 1.

Figure 5:
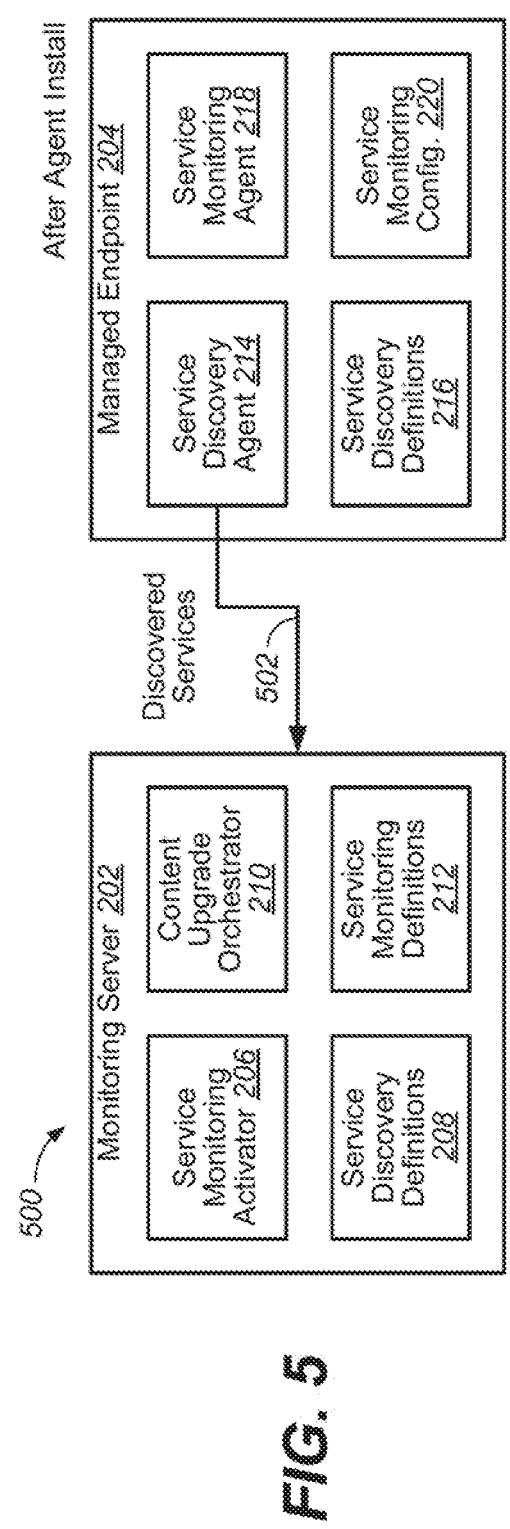
FIG. 5 is a block diagram of a system including a Monitoring Server and a Managed Endpoint after an Agent install, in accordance with an embodiment of the present invention.

With reference now to FIG. 5, a block diagram 500 of a system including a Monitoring Server 202 and a Managed Endpoint 204 after the Agent install is shown, in accordance with an embodiment of the present invention. It will be seen that in the embodiment of FIG. 5, and as depicted by the "Discovered Services" arrow 502, in various embodiments of the present invention, the Service Discovery Agent 214 of Managed Endpoint 204 discovers known/supported services and reports the results to the user. In various embodiments of the present invention the results are reported to the user using, for example, graphical user interface 130 of FIG. 1.

Referring now to FIG. 6, a diagram of a graphical user interface 600 for enabling a user to interact with the present content driven service discovery and agent monitoring capabilities on managed endpoints invention is shown, in accordance with an embodiment of the present invention. More specifically, the graphic user interface 600 depicts one embodiment of the present invention in which a user of the, present content driven service discovery and agent monitoring capabilities on managed endpoints invention selects one or more of the Discovered Services and submits a request for activating monitoring of those Discovered Services.

Referring now to FIG. 7, a diagram of a graphical user interface 700 for enabling a user to interact with the present content driven service discovery and agent monitoring capabilities on managed endpoints invention is shown, in accordance with an embodiment of the present invention. More specifically, the graphic user interface 700 depicts one embodiment of the present invention in which the Service Monitoring Activator 206 queries the Service Monitoring Definitions 212 to get the list of inputs (including the data type, validations etc.) that are required for monitoring the user selected service.

With reference now to FIG. 8, a block diagram 800 of a system including a Monitoring Server 202 and a Managed Endpoint 204 depicting when the Monitoring Server 202 uses the above information (provided as depicted in FIGS. 6 and 7) and shows a prompt to the user requesting the user to provide the inputs that are required for monitoring the selected service. In various embodiments of the present invention, the inputs prompted for selection by the user are specific to the previously selected service. Such prompting of the user is depicted by the "Query Service Input List" arrow 802, in various embodiments of the present invention. Further, in various embodiments of the present invention, the prompting of the user by the present content driven service discovery and agent monitoring capabilities on managed endpoints invention are provided to the user using, for example, graphical user interface 130 of FIG. 1. Further, in various embodiments of the present invention, the user responds to the prompting provided by the present content driven service discovery and agent monitoring capabilities on managed endpoints invention using, for example, graphical user interface 130 of FIG. 1.

Figure 9:
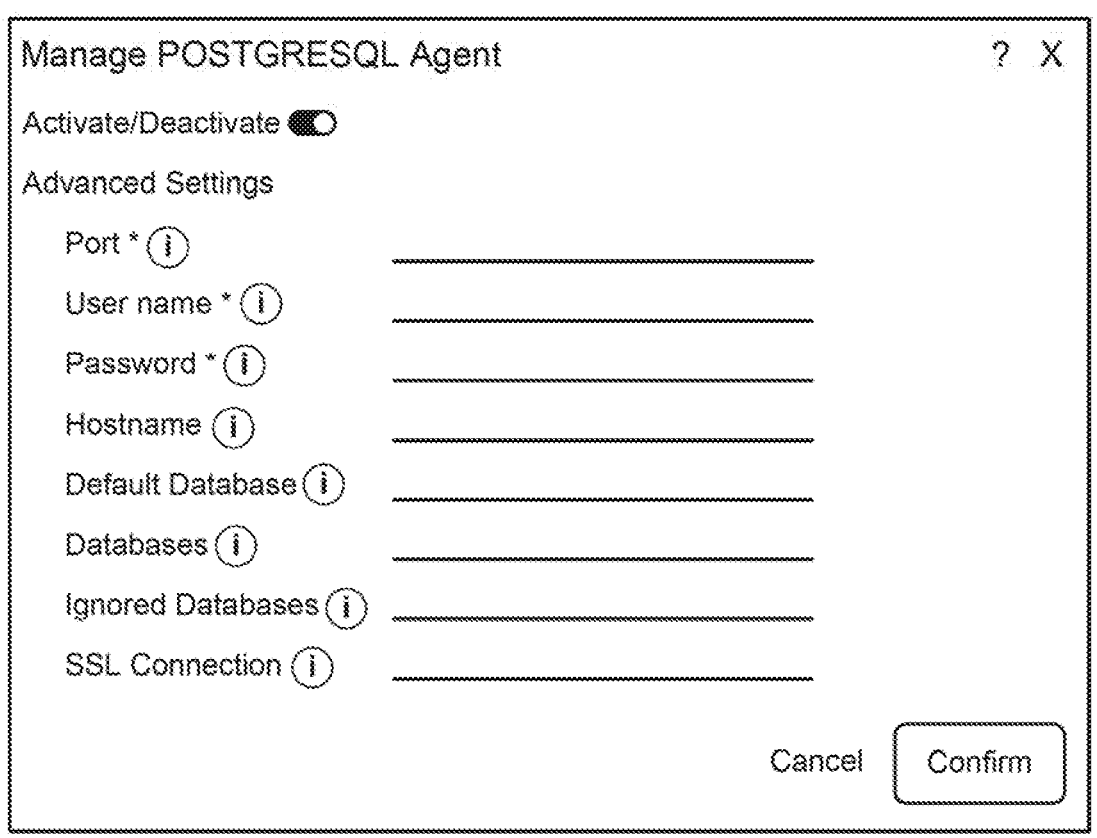
FIG. 9 is a diagram of a graphical user interface for enabling a user to interact with the present content driven service discovery and agent monitoring capabilities on managed endpoints invention, in accordance with an embodiment of the present invention.

Referring now to FIG. 9, diagram of a graphical user interface 900 for enabling a user to interact with the present content driven service discovery and agent monitoring capabilities on managed endpoints invention is shown, in accordance with an embodiment of the present invention. More specifically, the graphic user interface 900 depicts one embodiment of the present invention in which the user provides the requested inputs to the present content driven service discovery and agent monitoring capabilities on managed endpoints invention as described above.

With reference now to FIG. 10 a block diagram 1000 of a system including a Monitoring Server 202 and a Managed Endpoint 204 depicting when the Service Monitoring Activator 206 uses the Service Monitoring Definitions 212 to modify the configuration of the Agent at the Managed Endpoint 204 to start monitoring the user selected service. In embodiments of the present invention, such an action is graphically indicated by, for example, block 1002 of FIG. 10. Further, in various embodiments of the present invention, block 1002 of FIG. 10 is presented to a user of the present content driven service discovery and agent monitoring capabilities on managed endpoints invention using, for example, graphical user interface 130 of FIG. 10. FIG. 10 further depicts that the Service Monitoring Agent 218 on Managed Endpoint 204 has started monitoring the selected service.

Figure 11:
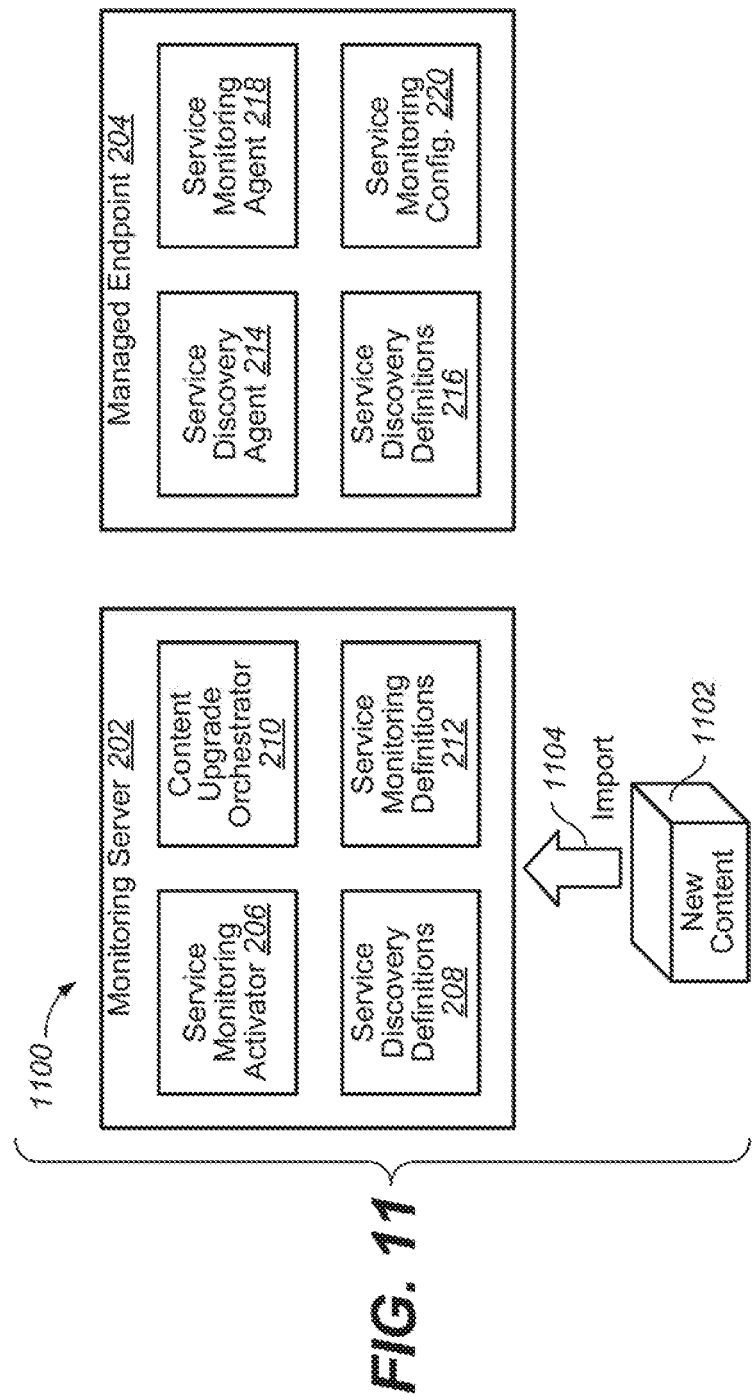
FIG. 11 is a block diagram of a system including a Monitoring Server and a Managed Endpoint depicting the import of new content, in accordance with an embodiment of the present invention.

With reference now to FIG. 11, a block diagram 1100 of a system including a Monitoring Server 202 and a Managed Endpoint 204 depicting when a user uploads new content to Monitoring Server 202 is shown. Such new content is depicted by the box labeled "New Content" 1102 and the uploading of such New Content 1102 to Monitoring Server 202 is indicated by "Import" arrow 1104 in various embodiments of the present invention. Further, in various embodiments of the present invention, the uploading of the New Content 1102 is performed by a user by the present content driven service discovery and agent monitoring capabilities on managed endpoints invention using, for example, graphical user interface 130 of FIG. 1.

With reference now to FIG. 12, a block diagram 1200 of a system including a Monitoring Server 202 and a Managed Endpoint 204 depicting the propagation of the New Content 1102 from Monitoring Server 202 to Managed Endpoint 204 is shown. Such propagation of New Content 1102 is indicated by "Propagate Content" arrow 1202 of FIG. 12.

With reference now to FIG. 13, a block diagram 1300 of a system including a Monitoring Server 202 and a Managed Endpoint 204 as the Service Discovery Agent 214 on Managed Endpoint 204 starts discovering additional services and applications is shown, in accordance with an embodiment of the present invention. It will be seen that in the embodiment of FIG. 13, and as depicted by the "Discovered Services" arrow 1302 in various embodiments of the present invention, the Service Discovery Agent 214 of Managed Endpoint 204 discovers the additional services and applications.

Hence, various embodiments of the present invention are described as: the user selects a service and chooses to activate monitoring; the Service Monitoring Server 202 shows a prompt to the user requesting the user to provide the inputs that are required for monitoring the selected service (Note that the inputs prompted must be specific to the selected service): the user provides the requested inputs; the Service Monitoring Agent 218 on the Managed Endpoint 204 starts monitoring the selected service; and if the Service Monitoring Definitions 212 for already monitoring application has changed (e.g., new inputs/capabilities added) since the update, the Monitoring Server 202 prompts the user to re-activate monitoring by providing the additional inputs to make use of the new monitoring features supported for that application in the upgrade.

Referring now to Service Discovery Agent 214, Service Discovery Agent 214 has functional capabilities that are in general required for performing service discovery, but Service Discovery Agent 214 itself does not have the knowledge of how to uniquely recognize and identify any service. This knowledge is separated into easily shippable files called content. As a further example, consider a simple service Discovery Agent 214 that has only the following capabilities: Enumerate list of running processes and their metadata (process name, Executable File Name, command Line Arguments, Installation and Working Directory); and match given regex on enumerated process metadata. This capability by itself has no use as it does not have the knowledge of how to use this capability to identify specific services. Hence, this knowledge goes into content referred to herein as Service Discovery Definitions 208.

As a further example, of operation of the present content driven service discovery and agent monitoring capabilities on managed endpoints invention, consider a simple definition to discovery mysql, jboss and tomcat services. Such services are computationally described and can be coded as follows:

My SQL
  Match Executable File Name to "mysqld"
Tomcat
  Match Executable File Name to "java"
  Match Command Line Arguments to "-Dcatalina.home=([^\s]+) */tomcat[\-0-9\.]\s.org\.apache\.catalina\.startup\.Bootstrap.*($|\s)"
JBoss
  Match Executable File Name to "java"
  Match Command Line Arguments to "-Dlogging.configuration=([^\]j+)\s.*org\.jboss\.as\.standalone\s.*-Djboss.home.dir=([^\s]+)*.*($|\s)"

Figure 14:
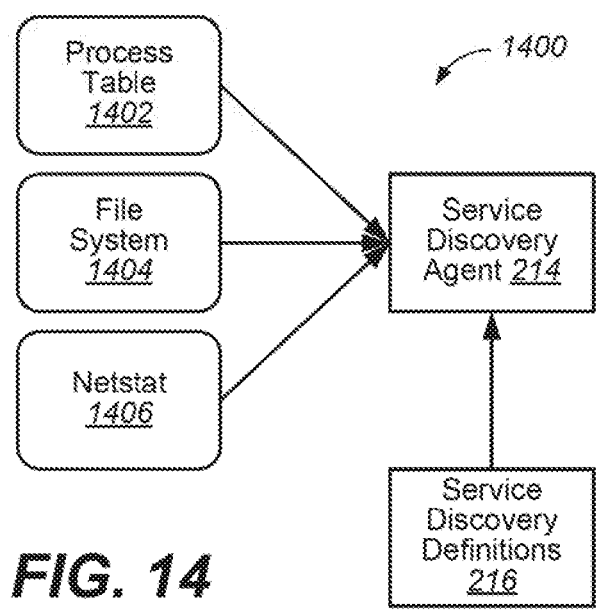
FIG. 14 is a schematic representation of a system including a Service Discovery Agent with Service Discovery Definitions and various other components and functionalities coupled thereto, in accordance with an embodiment of the present invention.

With reference next to FIG. 14, a schematic representation 1400 of a system including a Service Discovery Agent 214 with Service Discovery Definitions 216 and various other components and functionalities coupled thereto, is shown, in accordance with an embodiment of the present invention, It will be seen that in the embodiment of FIG. 14, a process table 1402, a file system 1404 and a Netstat component 1406 are coupled with Service Discovery Agent 214. As a further example of operation of the present content driven service discovery and agent monitoring capabilities on managed endpoints invention, such services are computationally described and can be coded as follows:

My SQL
  Match Executable File Name to "mysqld"
Tomcat
  Match Executable File Name to "java"
  Match Command Line Arguments to
  "-Dcatalina.home=([^\s]+) */tomcat[\-0-9\.]\s.org\.apache\.catalina\.startup\.Bootstrap.*($|\s)"
JBoss
  Match Executable File Name to "java"
  Match Command Line Arguments to "-Dlogging.configuration=([^\]j+)\s.*org\.jboss\.as\.standalone\s.*-Djboss.home.dir=([^\s]+)*.*($|\s)"

With reference still to FIG. 14, with this knowledge and the capabilities (process enumeration, regex matching) of the Service Discovery Agent 214, embodiments of the present invention can discover MySQL, Tomcat and JBoss, if they are running on the target Managed Endpoint 204. Further, in various embodiments of the present invention, rolling out support for discovering more services is as simple as pushing out new up/dated Service Discover Definitions 208 to the Managed Endpoint 204.

As a further example, of operation of the present content driven service discovery and agent monitoring capabilities on managed endpoints invention, consider the Content Upgrade Orchestrator 210. In one embodiment of the present invention, Content Upgrade Orchestrator 210 pushes the new Service Discover Definitions 208 to all of the Managed Endpoints 204 that are managed by the Monitoring Server 202.

Figure 15:
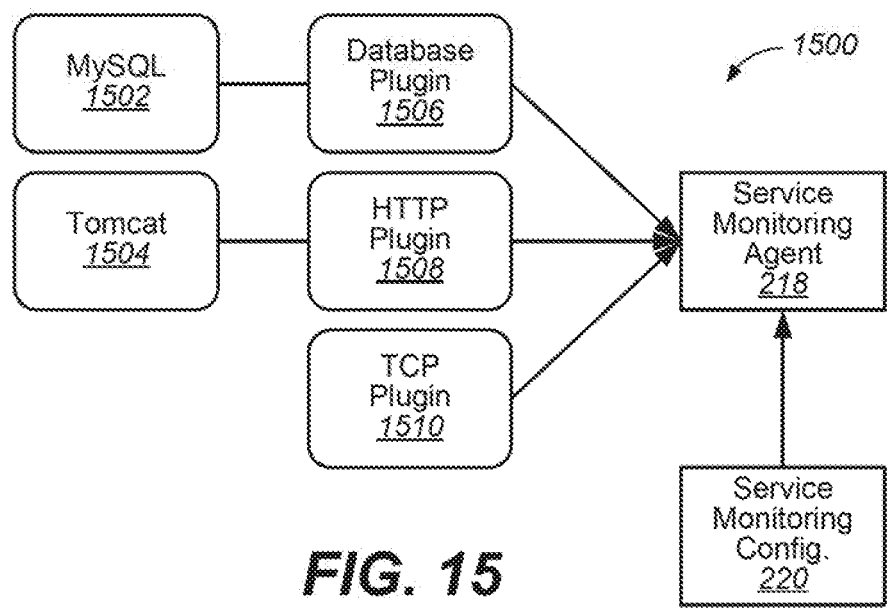
FIG. 15 is a schematic representation of a system including a Service Monitoring Agent with Service Monitoring Configuration and various other components and functionalities coupled thereto, in accordance with an embodiment of the present invention.

With reference next to FIG. 15, a schematic representation 1500 of a system including a Service Monitoring Agent 218 with Service Monitoring Configurations 220 and various other components and functionalities coupled thereto, is shown, in accordance with an embodiment of the present invention. It will be seen that in the embodiment of FIG. 15, a MySQL module 1502, a Tomcat module 1504, a Database Plugin 1506, an HTTP Plugin 1508 and a TCP Plugin 1510 are coupled with Service Monitoring Agent 218.

As a further example, of operation of the present content driven service discovery and agent monitoring capabilities on managed endpoints invention, consider the Service Monitoring Agent 218. In one embodiment of the present invention, similar to Service Discovery Agent 214, Service Monitoring Agent 218 also has certain built-in capabilities known as plugins. These capabilities alone, however, are not enough for monitoring a service. To monitor a service additional information is needed that varies from service to service. Consider, for example, a Service Monitoring Agent 218 that has the below capabilities which are computationally described:

- Query and read from databases (MySQL, MSSQL, Oracle, etc. provided that the following inputs are given
   - Database username
   - Database password
   - Database port
   - Optional SSL Configuration (Certs etc. . . . )
- Connect and read from a URL, provided that the following inputs are given
   - URL (including port)
   - Username
   - Password
   - Optional SSL Configuration (Certs etc. . . . )
- Pattern matching and parsing capability that can match a given pattern/regex to the data read from database or URL and can parse and extract metrics from the data. The parsing pattern/format.

These above described capabilities are alone not enough for the Service Monitoring Agent 218 to monitor services. Instead, Service Monitoring Agent 218 needs knowledge that defines how these capabilities can be used to monitor a service. In embodiments of the present invention, this knowledge goes into the Service Monitoring Configuration 220. For example, the below configuration information defines monitoring for a specific instance of MySQL and Apache. Such configuration information can be computationally described and coded as follows:

- My SQL
  - Connect to Database (Driver: MY SQL) on "localhost: 3306" with Username "root" and password "root"
  - Query "select * from INFORMATION_SCHEMA"
  - Parser (Column Matcher)
    - Metric Name (Column: "statement")
    - Metric Value (Column: "total_latemcy")
- Apache
  - Connect to URL "http://localhost:80/server_status"
  - Parser (HTML TABLE)
    - TABLE XPATH="/body/div[2]/table"
    - Metric Name (Column: "PID" & "ACC")
    - Metric Value (Column: "CPU" & "SS" & "Req")

Hence, in various embodiments of the present invention, the above information enables the Service Monitoring Agent 218 to monitor a specific instance of MySQL and Apache servers running on the same Managed Endpoint 204.

Referring now to Service Monitoring Activator 206, Service Monitoring Activator 206 is a component that enables embodiments of the present content driven service discovery and agent monitoring capabilities on managed endpoints invention to achieve content driven monitoring. More specifically, in various embodiments, Service Monitoring Activator performs the tasks of: receiving requests from user for activating a service; prompting for inputs required specific to that service; and updating the Service Monitoring Configuration 220 on the Managed Endpoint 204 to start monitoring the service.

In various embodiments of the present invention, the Service Monitoring Activator 206 itself does not have the knowledge of what inputs are required for monitoring a given service and on how to configure the Service Monitoring Agent 218 with the details on the readers and parsers for that service. Instead, in various embodiments of the present invention, such knowledge is defined in the Service Monitoring Definitions 212. In so doing, in embodiments of the present invention, the Service Monitoring Activator 206 also achieves separation between knowledge and function.

In embodiments of the present invention The Service Monitoring definitions 212 consists of two parts for each service. The two parts are: the mandatory and optional user inputs such as username, password, URL etc. which are required to be known to monitor the service; and a service configuration template that specifies the configuration of data readers and parsers. Such a configuration defines how the Service Monitoring Agent 218 will monitor and collect data for a service. The Service Monitoring Activator 206 fills in the user inputs (1) into the placeholders in the template (2) and updates this in the Service Monitoring Configuration 220 file on the target Managed Endpoint 204.

It should be noted that the present content driven service discovery and agent monitoring capabilities on managed endpoints invention achieves various benefits, Such benefits include, but are not limited to: the knowledge required for service discovery and monitoring can be pushed as content to a Managed Endpoint 204; embodiments of the present invention enable incremental rollout of support for discovering and monitoring new services; in embodiments of the present invention, there is no requirement for a binary package to be released or installed on the production machines, and, hence, there is less legal difficulty in roiling out the updates into production; embodiments of the present invention introduce opportunities for creating a marketplace-based system wherein third party publishers can publish their own content for supporting additional services; and embodiments of the present invention minimize the disruption to real-time monitoring and service discovery that's inherent in systems that require a full agent upgrade to get new content.

Furthermore, again for purposes and brevity and clarity, the following description of the various embodiments of the present invention, will be described using an example hi which the computer system generating the core dump or PSOD is a VMware ESXi™, enterprise-class, type-1 hypervisor developed by VMware, Inc. of Palo Alto, Calif. for deploying and serving virtual computers. Importantly, although the description and examples herein refer to embodiments of the present invention applied to the above computer system with, for example, its corresponding set of functions, it should be understood that the embodiments of the present invention are well suited to use with various other types of computer systems. Specifically, different types of computer systems will have, for example, a different operating system and/or different types of function stacks or back traces. However, the inventive concepts of the various embodiments of the present invention are also applicable to the different types of computer systems and their respective types of functions.

Importantly, the embodiments of the present content driven service discovery and agent monitoring capabilities on Managed Endpoints significantly extend what was previously possible. Various embodiments of the present content driven service discovery and agent monitoring capabilities on Managed Endpoints enable the improved capabilities while only requiring the endpoint agents to download incremental content definitions. This is in contrast to conventional approaches for application monitoring which simply frequently push complete upgrades to every endpoint agent in a desired environment. Thus, embodiments of present content driven service discovery and agent monitoring capabilities on Managed Endpoints monitoring invention provide an application and service monitoring methodology which extends well beyond what was previously known.

Also, although certain components are depicted in, for example, embodiments of present content driven service discovery and agent monitoring capabilities on Managed Endpoints monitoring invention, it should be understood that, for purposes of clarity and brevity, each of the components may themselves be comprised of numerous modules or macros which are not shown.

Procedures of the present method are performed in conjunction with various computer software and/or hardware components. It is appreciated that in some embodiments, the procedures may be performed in a different order than described above, and that some of the described procedures may not be performed, and/or that one or more additional procedures to those described may be performed. Further some procedures, in various embodiments, are carried out by one or more processors under the control of computer-readable and computer-executable instructions that are stored on non-transitory computer-readable storage media. It is further appreciated that one or more procedures of the present may be implemented in hardware, or a combination of hardware with firmware and/or software.

Hence, the embodiments of the present invention greatly extend beyond conventional methods of service or application monitoring Moreover, embodiments of the, present invention amount to significantly more than merely using a computer to perform conventional service or application monitoring processes. Instead, embodiments of the present invention specifically recite a novel process, necessarily rooted in computer technology, for content driven service discovery and agent monitoring capabilities on Managed Endpoints.

In various embodiments the present invention pushes new discovery and monitoring capabilities to agents without having to upgrade the agent's software. In so doing, the present embodiments enable efficient delivery of improved and/or additional application and service monitoring capabilities to already installed agents across in a large number endpoints. Thus, embodiments of the present invention teach novel approaches for using a computer to overcome a problem specifically arising in the computer-based realm of application and service monitoring.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiment", "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for altering an agent of a monitoring system, said method comprising:
    generating content information corresponding to said agent of said monitoring system, wherein said agent is content driven, said agent configured to utilize said content information to recognize and discover services using capabilities already present in said agent;
    pushing said content information to said agent;
    utilizing said content information to alter said agent such that an altered agent is generated, and such that content driven service discovery and monitoring is enabled by said agent;
    said altered agent is generated without requiring a complete update of said agent;
    wherein utilizing service discovery capabilities and service monitoring capabilities based on generated agent; and
    wherein said service discovery capabilities and said service monitoring capabilities are utilized as content information to recognize and discover services without requiring the use of binary files.

2. The computer-implemented method of claim 1 wherein said method utilizes a monitoring server, and said monitoring server monitors a service by updating content on said monitoring server.

3. The computer-implemented method of claim 1 wherein said method utilizes a monitoring server, and said monitoring server configures said agent to monitor services based upon content updated to said monitoring server.

4. The computer-implemented method of claim 1 wherein said agent discovers new services based upon new content received by a monitoring server.

5. A computer-implemented method for altering an agent of a monitoring system, said method comprising:
    generating content information for said agent wherein said agent is content driven, said agent configured to utilize said content information to recognize and discover services using capabilities already present in said agent;
    utilizing said content information to alter said agent, and such that content driven service discovery and monitoring is enabled by said agent;
    said altered agent is generated without requiring a complete update of said agent;
    wherein utilizing service discovery capabilities and service monitoring capabilities based on generated agent; and
    wherein said service discovery capabilities and said service monitoring capabilities are utilized as content information to recognize and discover services without requiring the use of binary tiles.

6. The computer-implemented method of claim 5 wherein said method utilizes a monitoring server, and said monitoring server to monitor a service by updating content on said monitoring server.

7. The computer-implemented method of claim 5 wherein said method utilizes a monitoring server, and said monitoring server configures said agent to monitor services based upon content updated to said monitoring server.

8. The computer-implemented method of claim 5 wherein said agent discovers new services based upon new content received by a monitoring server.

9. A computer-implemented method for altering an agent of a monitoring system, said method comprising:
- generating content information corresponding to said agent of said monitoring system by separating service specific functions for discovery and monitoring from said agent to thereby ascertain meta-data, using said meta-data to produce content information wherein said agent is content driven, said agent configured to utilize said content information to recognize and discover services using capabilities already present in said agent;
- pushing said content information to said agent;
- utilizing said content information to alter said agent such that an altered agent is generated, and such that content driven service discovery and monitoring is enabled by said agent;
- said altered agent is generated without requiring a complete update of said agent;
- wherein utilizing service discovery capabilities and service monitoring capabilities based on generated agent; and
- wherein said service discovery capabilities and said service monitoring capabilities are utilized as content information to recognize and discover services and without requiring the use of binary files.

10. The computer-implemented method of claim 9 wherein said method utilizes a monitoring server, and said monitoring server to monitor a service by updating content on said monitoring server.

11. The computer-implemented method of claim 9 wherein said method utilizes a monitoring server, and said monitoring server.

* * * * *